Aug. 24, 1965   A. K. BAILLIF   3,202,974
FLUID SUPPORTED MEMBERS
Filed Aug. 9, 1960   2 Sheets-Sheet 1

INVENTOR
ALLEN K. BAILLIF
BY Cushman, Darby & Cushman
ATTORNEYS

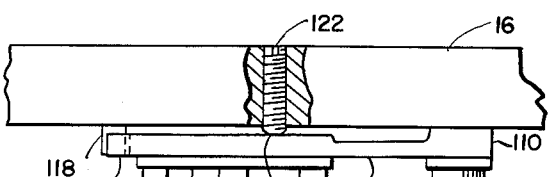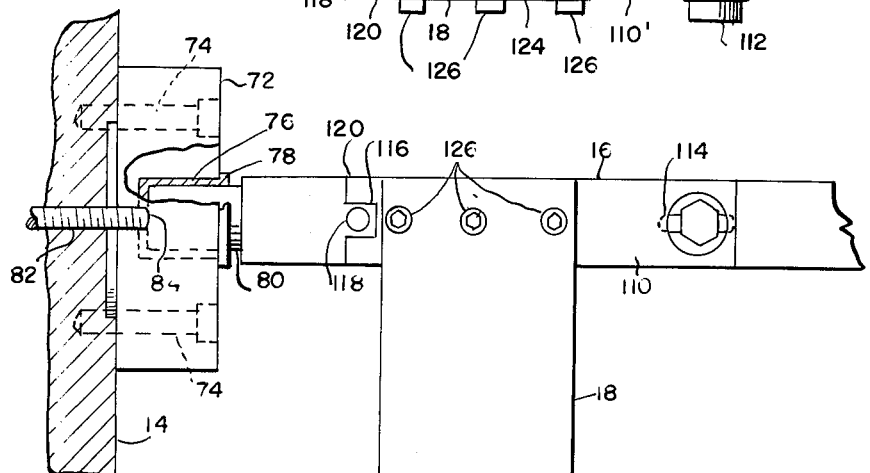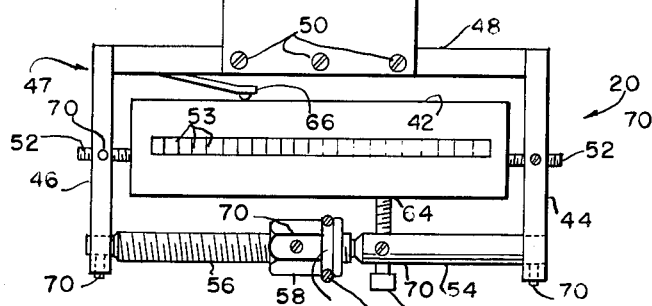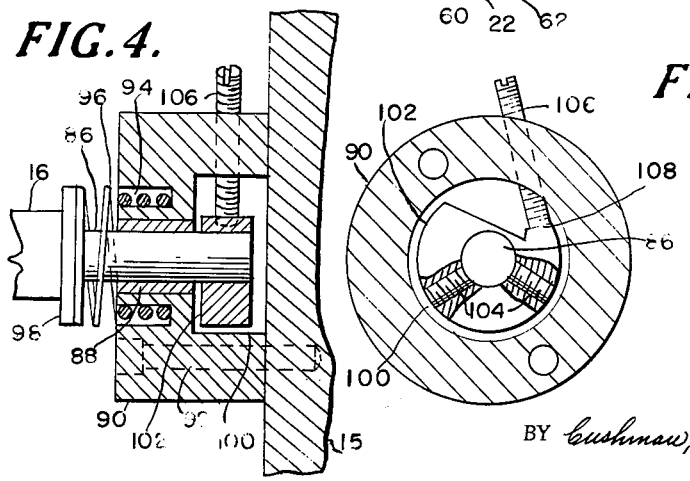
INVENTOR
ALLEN K. BAILLIF

United States Patent Office 3,202,974
Patented Aug. 24, 1965

3,202,974
FLUID SUPPORTED MEMBERS
Allen K. Baillif, Minneapolis, Minn., assignor to Sperry Rand Corporation, New York, N.Y., a corporation of Delaware
Filed Aug. 9, 1960, Ser. No. 48,527
8 Claims. (Cl. 340—174.1)

This invention pertains to apparatus for supporting members close to but out of contact with a relatively moving surface by a fluid acting between the member and the surface. As a specific example, the invention pertains to supporting electromagnetic transducing members near a moving surface by an intervening fluid boundary layer.

Accordingly, the general object of this invention is to provide interrelated adjusting means whereby a plurality of individual fluid boundary supporting members can be caused to accurately track with desired paths on a relatively moving surface. Specific objects of the invention will become fully apparent from the following detailed description of an illustrative embodiment of the invention, and from the appended claims.

The illustrative embodiment of the invention can be best understood with reference to the drawings, wherein:

FIGURE 3 shows a bottom plan view of details of a support member, resilient arm and boundary layer supported unit shown in FIGURES 1 and 2.

FIGURE 4 shows details of the apparatus of FIGURES 1 and 2.

FIGURE 5 is a further view of the construction shown in FIGURE 4, and

FIGURE 6 shows other details of the structure shown in FIGURES 1, 2 and 3.

Figure 2:
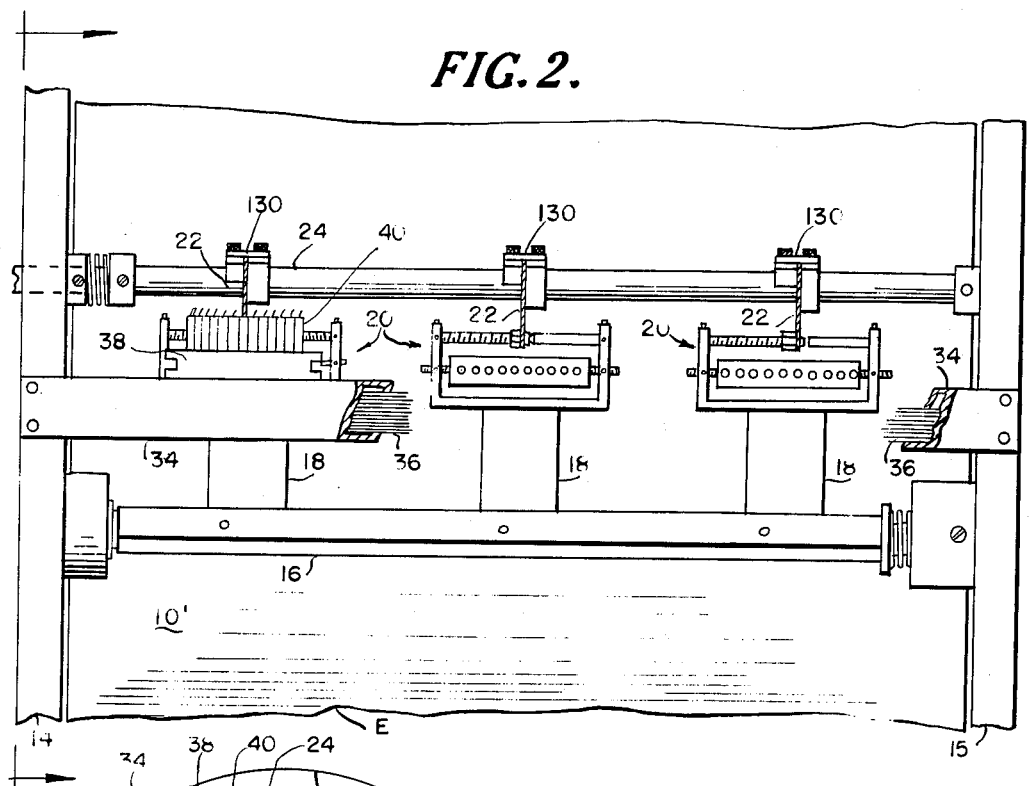
FIGURE 2 is a plan view of the apparatus of FIGURE 1.
Figure 1:
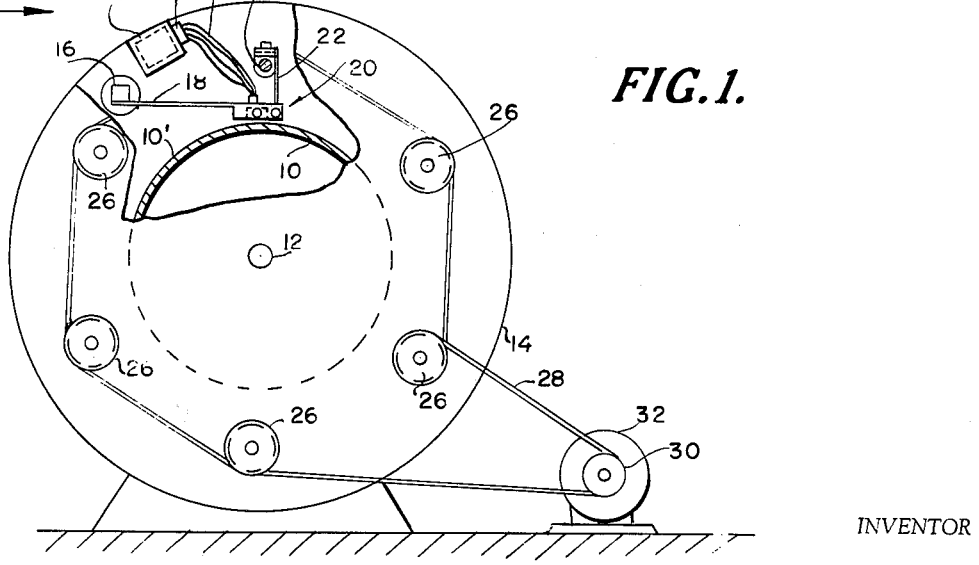
FIGURE 1 shows an end view, partially in section, of apparatus embodying the inventive features.

Referring particularly to FIGURES 1 and 2, the illustrative embodiment involves a cylindrical drum 10 journalled to rotate upon a shaft 12 in any suitable bearings, the details of which are not shown. These bearings are in end plates 14 and 15. The outer surface 10' of the drum 10 may be coated with a paramagnetic substance, for example, magnetic recording tape. About the surface of the drum 10 are to be positioned a plurality of sets of magnetic transducer assemblies, one such assembly being illustrated in FIGURES 1 and 2. Each assembly includes an elongated support member 16 extending between the end plates 14 and 15 and journalled therein in a manner to be described in detail hereinafter. Extending from each support member 16 is an an arm member 18, constructed of resilient, spring-like material. At the ends of the arms 18 remote from the support member 16 are units or members to be fluid boundary-layer supported, these designated in FIGURES 1 and 2 generally by reference character 20. For each boundary layer supported unit 20 there is provided a flexible cable 22 extending to a rotatable shaft 24 for the purpose of pulling all units 20 away from the drum surface 10' when desired. Each shaft 24 terminates outside the end plate 14 in a pulley 26, and all of the pulleys are joined together by a flexible cable 28 which has at least one turn about each pulley 26 and at least one turn about the pulley 30 of a motor 32, the operation of which will be explained hereinafter.

It is to be understood that a plurality of support members 16 and associated components like those above described are distributed about the drum, one for each pulley 26.

The apparatus is further provided with an elongated box conduit member 34 extending between the end plates 14 and 15, for carrying a plurality of conductors 36. In the vicinity of each boundary layer supported unit 20 an outlet box 38 is provided in conduit 34, for plugging thereinto a plurality of flexible conductors 40 which at their opposite ends plug into the electromagnetic transducing member, to be described below, which constitutes a part of the boundary layer supported unit 20.

Referring now to FIGURE 3, a representative support member 16, arm 18 and unit 20 are shown in greater detail, viewing same from the recording surface side. The unit 20 comprises a block-like structure 42, the bottom of which is preferably smooth and projects beneath the side arms 44 and 46 of a cradle 47 a sufficient distance to preclude the arms 44 and 46 from coming into contact with the drum surface 10'. The cradle 47 for supporting the block 42 is further characterized by member 48 to which the arm 18 is fixedly attached as by screws 50. The transducer mounting block member 42 is pivotally supported in the cradle arms 44 and 46 by screw-threaded members 52.

The block 42 will have a plurality of individual transducer units 53 embedded therein, with the recording gaps preferably flush with the bottom surface of block 42 (seen in FIG. 3). However, the details of the transducers are not further explained herein, since for purposes of the present block 42 may be considered as simply a general unit to be supported by a fluid boundary layer. It is only necessary herein to understand that the block 42 is to be fluid supported in use, and retractable away from the drum surface when the surface is to be stopped. And the block is to be adjustable as to its position lengthwise of the drum 10, so that its transducers will sweep tracks interfitting with other tracks swept by other transducers.

Details of proper balancing of block 42 relative to its pivot support screws 52 may be understood from copending applications of Donald K. Sampson, Serial No. 817,560, filed June 2, 1959; R. J. Eulberg, Serial No. 145, now Patent No. 3,055,594, filed August 9, 1960, and R. W. Clarke et al., Serial No. 146, now Patent No. 2,983,492, filed August 9, 1960, all assigned to the assignee of the present application.

Across the back of the cradle 47 constituted by arms 44, 46 and 48 is a member 54 screw-threaded as at 56 along at least a part of its length for receiving a threaded nut 58 having a groove 60 therein about which the end of the cable 22 may be tied. Further supported in the member 54 is a screw-threaded member 62 for abutting as at 64 the downstream side of the transducer block 42, for limiting rotation thereof about the pivot points defined by the screws 52. A suitable spring 66 may be provided, mounted in the cradle arm 48, for exerting some force against the transducer mounting block 42 for causing same to rotate about screws 52 in a direction tending to seat same against the end 64 of screw 62. The reason for the spring 66 and screw 62 are discussed in detail in the aforementioned applications.

Set screws, all designated 70, may be used to lock the various screw-threaded members in place.

Each support member 16 is journalled at its ends in devices in turn mounted upon the end plates 14 and 15, and arranged as to permit adjustable rectilinear movement of the support member 16 parallel to the axis of the drum 12. As shown in FIGURE 3, at the end of support member 16 adjacent end plate 14, a hub 72 is fastened to the plate 14 by suitable screw members 74. Centrally of the hub 72 is a circular chamber 76 into which is placed a suitable bushing 78 if desired. The end of support member 16 is cylindrical as at 80 and fits into bushing 78. A screw-threaded member 82, engaging a threaded hole in the end plate 14 and accessible from the outside, bears as at 84 against the end of support member 16.

The details of the mounting of the support member 16 adjacent the end plate 15 are shown in FIGURE 4. Here support member 16 terminates in a cylindrical end 86, which is journalled in a bushing 88 which is, in turn, mounted in a hub 90 which is affixed to the end plate 15 by suitable screws such as 92. The hub 90 is provided with an annular recess 94 which receives one end of a spring 96, the other end of which bears against a collar 98 on the support member 16. The spring 96 is under compression, and therefore tends to move the support member 16 to the left as viewed in FIGURES 3 and 4. Accordingly, it is the screw-threaded member 82 which restrains movement of the support member 16, and if the screw-threaded member 82 is screwed into the plate 14 from the outside, it will force the support member 16 to the right section viewed in FIGURES 3 and 4. It is to be noted that there is sufficient space provided for appreciable rectilinear movement of the support member 16.

The hub 90 is further characterized by an annular recess 100 at the end of the hub in contact with the end plate 15 and within the annular recess 100 is a cam member 102 secured to the cylindrical end 86 of support member 16 by suitable set screws 104 (FIG. 5). The hub 90 is further provided with an angled, threaded hole into which a threaded screw member 106 is inserted, this bearing against a portion of the cam member at point 108. Turning of screw 106 in a direction to cause it to enter into the annular recess 100 will impart a rotary motion to the cam 102 and therefore the support member 16 in a direction tending to force the boundary layer supported unit 20 toward the surface 10′ of the drum 10.

FIGURES 3 and 6 show the details of the mounting of the arms 18 upon the support member 16. A cantilever arm member 110 is fixed upon member 16 by a bolt 112 which proceeds through a slot 114 in member 110, permitting rectilinear adjustment of the cantilever arm member 110 upon the support member 16 when bolt 112 is loosened. The opposite end of the cantilever arm member 110 is provided with a slot 116 which surrounds a pin 118 fixed in support member 16. The cantilever arm member 110 has a length of reduced cross-section 110′ (FIG. 6) to provide some resilient yieldability thereto. The cantilever arm member 110 is initially formed to cause its free end 120 to contact the support member 16. To adjustably force the free end 120 away from the support member 16, there is provided a set screw 122 threaded into support member 16 and engaging the cantilever arm member 110 as at 124. The arm member 18 is fixedly mounted upon the cantilever arm member 110 as by screws 126.

The shafts 24 are provided with a cable clamping device 130 in proximity to each boundary layer supported member 20. The devices 130 are fixed to the shaft 24 so that they may be moved along the shaft as desired.

The structure described hereinabove is such as to permit the complete adjustment of a plurality of transducer block support members 42 so that the entire surface of the drum can be covered with narrow recording tracks resulting from the scanning by each individual transducer pole piece, it being understood that the support member 16 and conduit members 34 are duplicated about the drum as are the shafts 24 and pulleys 26 best shown in FIGURE 1. The arms 18 on the other support member 16 are staggered so as to have the total of the transducer mounting blocks 42 cover the entire drum surface.

A first type of adjustment is to move a support member 16 endwise between the end plates 14 and 15, by use of the screw-threaded member 82 (FIG. 3). A second type of adjustment is by use of the set screw 122 (FIG. 6) to act upon the cantilever arm member 110, to thereby provide an annular or twisting motion of the arm member 18 with respect to the support member 16. A third type of adjustment is to utilize the screw-threaded member 106 (FIGS. 4 and 5) to increase or decrease the tension upon the resilient arm members 18 tending to force the transducer mounting blocks 42 into contact with the boundary layer which will separate same from the drum surface when they latter is moving. A fourth type of adjustment is provided by the screws 52 (FIG. 3) which permit the lateral movement of the transducer mounted block 42 relative to the cradle arms 44 and 46, and therefore to the arms 18. A further type of adjustment is to move cantilever arm member 110 relative to its holding bolt 112.

When the motion of the drum is to be stopped, it is necessary to retract all of the transducer mounting block members safely out of the way before the "flying" action due to the boundary layer ceases. It is for this purpose that the shafts 24 and pulleys 26 are provided. It will be seen that energization of the motor 30 will cause rotary motion of all shafts 24 so as to wind up the cables 22 thereupon, pulling the cradles away from the drum surface. However, in pulling a cradle away from the drum surface, and in subsequently lowering it when the drum is in motion, it is necessary to exert a pull upon the cradle which is centered with respect to the arm 18 so as to not raise one side or the other of the cradle more than the other. It is for this reason the nut 58 (FIG. 3) is provided to engage with the screw-threads on member 54, to permit longitudinal adjustment of the point of pull of the cable 22. And the devices 130 (FIG. 2) are made adjustable along the shafts 24 so that a direct upward pull can be exerted on the cables 22.

The hereinafter described exemplary embodiment has been shown only for purposes of illustration, and the scope of the invention is to be determined from the appended claims.

What is claimed is:

1. In apparatus for boundary fluid support of members from a relatively moving surface, a relatively moving surface, a plurality of members to be supported by boundary fluid from the relatively moving surface, an elongated support member, an arm means for each boundary supported member connected at one end thereof to said member, the other end of each arm means connected to said support member, means for guiding said surface in a path of travel, means fixed with respect to said guiding means for movably mounting said support member, said mounting means including means for adjusting the longitudinal position of said support member relative to said mounting means to alter in unison the positions of said boundary supported members in a direction at an angle to the direction of relative movement of the surface thereto without tending to alter the separation of the boundary supported members from the surface or the angle thereof to the direction of record movement under any operating condition, said mounting means includes bearings receiving portions of said support means, the bearings permitting longitudinal movement of said support member therein, and resilient means for urging said support member in one direction in said bearings, and a screw-threaded member for adjustably retaining said support member against the force of said resilient means.

2. In apparatus for boundary fluid support of members from a relatively moving surface:
   (A) a relatively moving surface;
   (B) a plurality of members to be supported by boundary fluid from the relatively moving surface;
   (C) an elongated support member;
   (D) an arm means for each boundary supported member connected at one end thereof to said support member;
   (E) cradle means connected to the other end of said arm means; said cradle means including,
   (F) means for pivotally supporting said boundary supported member, said pivotally supporting means being adjustable for laterally adjusting said boundary supporting member relative to said arm means;
   (G) means for guiding said surface in a path of travel;
   (H) means fixed with respect to said guiding means for movably mounting said support member; said mounting means including, (I) means for adjusting the longitudinal position of said support member relative to said mounting means to alter in unison the positions of said boundary supported members in a direction at an angle to the direction of relative movement of the surface thereto without tending to alter the separation of the boundary supported members from the surface or the angle thereof to the direction of record movement under any operating condition.

3. Apparatus as in claim 1 and further including means for laterally adjusting the position of connection of each arm to said support member.

4. Apparatus as in claim 3 and further including means for laterally adjusting the position of each boundary supported member relative to the arm connected thereto.

5. Apparatus as in claim 1 and further including between each arm and boundary supported member a cradle, cable means for moving the cradle toward and away from the surface, and means for connecting the cable means to the cradle, the last mentioned means being laterally adjustable.

6. Apparatus as in claim 1 wherein said mounting means includes cam means for rotating said support member about the longitudinal axis thereof irrespective of the longitudinal position thereof.

7. In apparatus for boundary fluid support of members from a moving surface, a framework having means for defining the path of travel of the surface, a plurality of support members transversely movable with respect to directional rotation of the moving surface each having at least one boundary supported member attached thereto, means for maintaining the support members on the framework, and means for moving the boundary supported members toward and away from said surface, the last mentioned means including a shaft journalled in said framework for each support member, a cable running from each boundary supported member to one of said shafts, and means for rotating all of said shafts in unison to reel or unreel all of said cables concurrently.

8. Apparatus as in claim 7 wherein the means for rotating the shafts in unison includes a pulley on each shaft, and a cable with at least one turn about each pulley whereby rotation of any one pulley results in corresponding rotation of the others in unison.

References Cited by the Examiner

UNITED STATES PATENTS 2,862,781  12/58  Baumeister _____ 340—174.1
3,001,850   9/61  Morrs _____ 340—174.1

FOREIGN PATENTS 793,237  4/58  Great Britain.

IRVING L. SRAGOW, *Primary Examiner.*

BERNARD KONICK, *Examiner.*